United States Patent Office 2,872,104
Patented Feb. 3, 1959

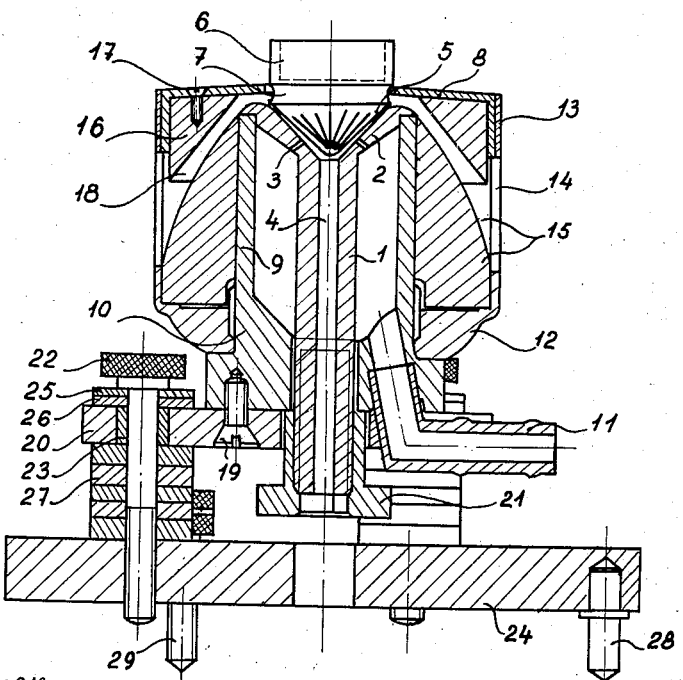

2,872,104

ULTRACENTRIFUGE

Bedřich Čižinský, Řicany, near Prague, Czechoslovakia

Application September 17, 1956, Serial No. 610,702

Claims priority, application Czechoslovakia
September 20, 1955

6 Claims. (Cl. 233—23)

This invention relates to very high-speed centrifuges (ultracentrifuges) driven by a compressed gas and working under atmospheric pressure. In view of its simpler and less expensive design preference is given in practice to this type of centrifuges over ultracentrifuges working under reduced pressure. As far as in this specification and in the claims the term compressed air is used, it is understood that this expression includes any suitable compressed gas.

Ultracentrifuges of the kind referred to include a stator with a seating in the shape of a hollow cone and a rotor provided on its conical surface with substantially radial grooves and fitting into this seating. These grooves which are usually a little inclined towards the radius, say at an angle of 10°, are in this specification and in the claims called substantially radial grooves. Compressed air entering into the pressure chamber of the stator passes across its seating through nozzles directed obliquely upwards and the air jets leaving the nozzles lift the rotor and make it rotate so that the rotating rotor lies on a thin air cushion or air bearing, the vertex angle of the rotor cone being a little greater than the vertex angle of the hollow stator cone. The stator has a central bore connected to the atmospheric air which determines and stabilizes the height of the air cushion. The air cushion allows the rotor to choose its most suitable axis of rotation within the given limits of equilibrium.

The original centrifuges of the type referred to did not satisfy mainly for the reason that they were not stable enough and because an increasing air pressure threw the rotor out of the stator seating. The centrifuges have been improved later in this respect by making the largest diameter of the rotor cone smaller than the largest diameter of the hollow stator cone and by rounding off the upper edge of this hollow stator cone, thus influencing advantageously the air flow.

Nevertheless the ultracentrifuges thus improved still did not comply with all the requirements. More particularly they did not permit using rotors with long deep grooves in their conical surfaces and without such long deep grooves ultra-speeds cannot be attained.

The ultracentrifuge according to the present invention exhibits not only extremely high speed but is characterized also by a most regular and smooth action and by high stability.

The invention is based on the discovery that the responsibility for the dissatisfying performance of the known ultracentrifuges lies mainly with the insufficient guidance of the air leaving the space between the hollow stator cone and the conical rotor surface and with the unsuitable mounting of the apparatus in its support.

In accordance with an aspect of the invention deflectors are provided for guiding the air leaving the space between the hollow stator and the conical rotor surface, these deflectors forming an annular space having downwardly inclined side walls, with the annular space widening, though moderately in the greater part of its cross section in the direction of the air flow, and with at least one of the side walls of the annular space being preferably curved also in its vertical cross section and the rounded off upper edge of the hollow stator cone preferably passing the points where the air enters the annular space continually into the guiding surface delimiting the said annular space towards the inner part of the apparatus. Furthermore it has been found to be advantageous to truncate the vertex of the rotor cone, preferably with a rounded off vertex.

The stability and the smooth action of the ultracentrifuge according to the invention may be further improved by building the body of the centrifuge as light as possible in comparison with the centrifuge support and by connecting the body and support by means of suitable buffers.

The enclosed drawings illustrate, of course by way of example only, an embodiment of the ultracentrifuge according to the invention.

Fig. 1 is partly a vertical axial section, and partly a side view of the apparatus, Fig. 2 is a longitudinal section through the stator column and the conical seating, and Fig. 3 a top view of the hollow stator cone.

The stator of the centrifuge includes the column 1 with the hollow cone 2 through which pass eight nozzles 3 (only four of them being shown in Fig. 3), these nozzles being inclined at an angle $\alpha$ of 55° towards the vertical and at an angle $\beta$ of 76° towards the radius (Figs. 2 and 3). The column 1 has a bore 4 which is 0.12 inch wide and communicates with the outer atmosphere. The nozzles 3 have an inner diameter of 0.027 inch. When the apparatus is not in action the rotor 5 rests with its conical surface in the hollow cone 2 of the stator 1. A cavity 6 is formed in the upper cylindrical part of the rotor 5. The rotor 5 extends through a circular cutout in a lid 8 and the rotor has between its conical and cylindrical part at the level of the lid 8 a circular groove 7 responsible for the smooth start and landing of the rotor. The conical surface of the rotor 5 has substantially radial rather deep grooves extending nearly from the vertex up to the base of the conical surface. The column 1 and the lower surface of the hollow stator cone 2 form together with a surrounding cylindrical body 9 having a widened lower part 10 an annular pressure chamber which has an inlet 11 for the compressed air to which the end of a flexible tube (not shown) can be fixed. The outer casing of the centrifuge is formed by a sleeve 12 carrying a cylindrical jacket 13 which is closed at its top by the already mentioned lid 8. The jacket 13 is provided with openings 14 through which the air leaves the apparatus. A deflector 15 is disposed around the body 9, and the upper edge of the hollow stator cone 2 is rounded (Fig. 1) to form a smooth continuation of the outer surface of the deflector 15. This deflector 15 forms together with a second deflector 16 fixed by screws 17 within the lid 8 an annular space 18 with inclined walls which widens in the downward direction over the greater part of its cross section.

The unit consisting of the pressure chamber formed by the column 1, cone 2, body 9 and widened lower part 10, and the casing formed by outer casing 12, jacket 13 and lid 8 is connected by means of screws 19 to a three arm star 20, through the center of which passes the column 1 held by a nut 21. The section as shown in Fig. 1 of the drawing passes through the central longitudinal plane of one of the three arms of this star 20. A screw 22 passes through a sleeve 23 in a bore of each arm of the star 20, the screws 22 pressing the arms of the star elastically against a relatively heavy support 24. This elastic connection is provided by a fiber washer 25, a rubber ring 26 and rubber plates 27 on each screw 22 between the related arm of the star 20 and the support 24. By means of a fixed pin 28 and adjustable screws 29 forming legs for the support 24, the latter can be adjusted into the horizontal position.

Figs. 2 and 3 show the arrangement and position of the nozzles 3 in the hollow stator cone 2. As mentioned above the drawing illustrates only four of the eight nozzles 3 which are provided. α denotes the vertex angle of 91° of the hollow stator cone 2, β the angle of 55° between the nozzle axis and the vertical and γ the angle of 76° between the nozzle axis and the diameter of the circle at the respective level of the conical surface.

The centrifuge, the inlet 11 of which is connected to a source of compressed air by means of a non-illustrated flexible tube, functions as follows: First compressed air is allowed to enter up to pressure of 2 atmospheres. The air from the pressure chamber defined by the parts 1, 2, 9 and 10 passes through the nozzles 3, and the resulting jets of compressed air lift the rotor 5 so that an air bearing is formed between the conical surface of the rotor 5 and the hollow stator cone 2. The rotor 5 starts at once to rotate with high speed by the action of the air jets leaving the nozzles 3 and striking against the substantially radial grooves in the surface of the rotor cone. Within 10 to 20 seconds the pressure of the entering air can be increased to about 4.5 atmospheres. The air from the space between the hollow stator cone 2 and the rotor cone 5 enters with a speed exceeding the velocity of sound the annular space 18 where it flows first along the rounded off upper edge of the stator cone 2 and then along the surface of the deflector 15 and leaves the apparatus thereafter through the openings 14. The sticking of the flowing air to the surface of the deflector 15 is due to the phenomenon well known to physics according to which a thin quickly flowing air layer tends to adhere to a solid surface. The second deflector 16 further promotes the adherence of the air flow to the deflector 15. In the illustrated embodiment of the invention the active surface of the deflector 16 has a vertical cross section following a straight line; this cross section may be also curved, however, in suitable cooperation with the opposite active surface of the deflector 15. The deflectors 15 and 16 prevent the formation of vortices within the apparatus and chiefly these deflectors are responsible for the regular and smooth action of the centrifuge notwithstanding the relativley great deepness of the substantially radial grooves provided in the surface of the rotor cone 5 and which number 36 to 40.

What I claim is:

1. Ultracentrifuge working under atmospheric pressure, comprising a stator with a seating in the shape of a hollow cone and a rotor with a conical surface fitting into said seating, said rotor having substantially radial grooves in its conical surface, said stator defining a pressure chamber, means for admitting compressed air into said pressure chamber, nozzles disposed in said conical seating to emit jets of air from the pressure chamber at an angle to the radius and directed obliquely upwards, the stator having a central bore communicating with atmospheric air, the largest diameter of said conical surface of the rotor being smaller than the largest diameter of the hollow stator cone, the vertex angle of the hollow stator cone being a little smaller than the vertex angle of the conical surface of the rotor, the upper edge of the hollow stator cone being rounded, deflectors with surfaces inclined downwardly in an outward direction disposed around the stator for leading the air flow leaving the space between the hollow stator cone and the conical surface of the rotor, the surfaces of said deflectors forming an annular space for said air flow which widens, at least for the greater part of its vertical cross section, in the direction of the air flow.

2. Ultracentrifuge working under atmospheric pressure, comprising a stator with a seating in the shape of a hollow cone and a rotor with a conical surface fitting into said seating, said rotor having substantially radial grooves in its conical surface, said stator defining a pressure chamber, means for admitting compressed air into said pressure chamber, nozzles disposed in the conical seating at an angle to the radius and directed obliquely upwards to emit jets of air from the pressure chamber against said conical surface of the rotor, the stator having a central bore communicating with atmospheric air, the largest diameter of said conical surface of the rotor being smaller than the largest diameter of the hollow stator cone and the vertex angle of the hollow stator cone being a little smaller than the vertex angle of said conical surface of the rotor, the upper edge of the hollow stator cone being rounded, deflectors with surfaces inclined downwardly in an outward direction disposed around the stator for leading the air flow leaving the space between the hollow stator cone and the conical surface of the rotor, at least one of said surfaces of the deflectors being curved also in vertical cross section, and said surfaces of the deflectors forming an annular space for said air flow which widens at least in the greater part of its vertical cross section in the direction of the air flow.

3. Ultracentrifuge working under atmospheric pressure, comprising a stator with a seating in the shape of a hollow cone and a rotor with a conical surface fitting into said seating, said rotor having substantially radial grooves in its conical surface, the stator defining a pressure chamber, means for admitting compressed air into said pressure chamber, nozzles disposed in the conical seating at an angle to the radius and directed obliquely upwards to emit jets of air from said pressure chamber against said conical surface of the rotor, the stator having a central bore communicating with atmospheric air, the largest diameter of said conical surface of the rotor being smaller than the largest diameter of the hollow stator cone and the vertex angle of the hollow stator cone being a little smaller than the vertex angle of said conical surface of the rotor, the upper edge of the hollow stator cone being rounded, deflectors with surfaces inclined downwardly in an outward direction disposed around the stator for leading the air flow leaving the space between the hollow stator cone and the conical surface of the rotor, said surfaces of the deflectors forming an annular space for said air flow which widens at least in the greater part of its vertical cross section in the direction of the air flow, said rounded upper edge of the hollow stator cone being a smooth continuation of the surface of the deflector which delimits said annular space at the inner side of the latter.

4. Ultracentrifuge working under atmospheric pressure, comprising a stator with a seating in the shape of a hollow cone and a rotor with a conical surface fitting into said seating, said rotor having substantially radial grooves in its conical surface, the stator defining a pressure chamber, means for admitting compressed air into said pressure chamber, nozzles disposed in the conical seating at an angle to the radius and directed obliquely upwards to emit jets of air from said pressure chamber against said conical surface of the rotor, the stator having a central bore communicating with atmospheric air, the largest diameter of said conical surface of the rotor being smaller than the largest diameter of the hollow stator cone and the vertex angle of the hollow stator cone being a little smaller than the vertex angle of said conical surface of the rotor, the upper edge of the hollow stator cone being rounded, deflectors with surfaces inclined downwardly in an outward direction disposed around the stator for leading the air flow leaving the space between the hollow stator cone and the conical surface of the rotor, said surfaces of the deflectors forming an annular space for said air flow which space widens at least in the greater part of its vertical cross section in the direction of the air flow, said vertex of the conical surface of the rotor being truncated.

5. Ultracentrifuge working under atmospheric pressure, comprising a stator with a seating in the shape of a hollow cone and a rotor with a conical surface fitting into said seating, said rotor having substantially radial grooves in its conical surface, the stator defining a pressure chamber, means for admitting compressed air into said pressure chamber, nozzles disposed in the conical seating at an angle to the radius and directed obliquely upwards to emit jets of air from said pressure chamber against said conical surface of the rotor, the stator having a central bore communicating with atmospheric air, the largest diameter of said conical surface of the rotor being smaller than the largest diameter of the hollow stator cone and the vertex angle of the hollow stator cone being a little smaller than the vertex angle of said conical surface of the rotor, the upper edge of the hollow stator cone being rounded, deflectors with surfaces inclined downwardly in an outward direction disposed around the stator for leading the air flow leaving the space between the hollow stator cone and the conical surface of the rotor, said surfaces of the deflectors forming an annular space for said air flow which space widens at least in the greater part of its vertical cross section in the direction of the air flow, said rounded upper edge of the hollow stator cone being a smooth continuation of the surface of the deflector which delimits said annular space at the inner side of the latter, and said vertex of the conical surface of said rotor being truncated.

6. Ultracentrifuge working under atmospheric pressure, comprising a stator with a seating in the shape of a hollow cone and a rotor with a conical surface fitting into said seating, said rotor having substantially radial grooves in its conical surface, the stator defining a pressure chamber, means for admitting compressed air into said pressure chamber, nozzles disposed in the conical seating at an angle to the radius and directed obliquely upwards, the stator having a central bore communicating with the atmosphere, the largest diameter of said conical surface of the rotor being smaller than the largest diameter of the hollow stator cone and the vertex angle of the hollow stator cone being a little smaller than the vertex angle of said conical surface of the rotor, the upper edge of the hollow stator cone being rounded, deflectors with surfaces inclined downwardly in an outward direction disposed around said stator for leading the air flow leaving the space between the hollow stator cone and the conical surface of the rotor, said surfaces of the deflectors forming an annular space for said air flow which space widens at least in the greater part of its vertical cross section in the direction of the air flow, at least one of said surfaces of the deflectors being also curved in vertical cross-section, said rounded upper edge of the hollow stator cone being a smooth continuation of the surface of the deflector which delimits said annular space at the inner side of the later, said vertex of the conical surface of said rotor being truncated.

References Cited in the file of this patent

UNITED STATES PATENTS

| | | |
|---|---|---|
| 1,405,564 | Baumann | Feb. 7, 1922 |
| 2,213,107 | McBain | Aug. 27, 1940 |
| 2,353,150 | Dietz | July 11, 1944 |
| 2,623,356 | Coanda | Dec. 30, 1952 |